United States Patent [19]
Galloway

[11] 3,895,606
[45] July 22, 1975

[54] MODULAR KENNEL BUILDING
[76] Inventor: Charles H. Galloway, P.O. Box 3449, Bryan, Tex. 77801
[22] Filed: Jan. 25, 1974
[21] Appl. No.: 436,538

[52] U.S. Cl. .................................. 119/16; 119/27
[51] Int. Cl. ............................................ A01k 1/00
[58] Field of Search ............ 119/16, 20, 27, 28, 19; 52/241

[56] References Cited
UNITED STATES PATENTS
| | | | |
|---|---|---|---|
| 1,379,725 | 5/1921 | Shodron | 119/16 |
| 3,225,737 | 12/1965 | Biehl | 119/16 |
| 3,305,983 | 2/1967 | Bus | 52/241 X |
| 3,537,217 | 11/1970 | Lickliter et al. | 52/241 X |
| 3,584,603 | 6/1971 | Rutherford | 119/28 |
| 3,699,924 | 10/1972 | Hero | 119/16 |

Primary Examiner—Hugh R. Chamblee
Attorney, Agent, or Firm—Arnold, White & Durkee

[57] ABSTRACT

A modular, fully self-contained kennel building for housing animals in close proximity. The kennel building is composed of rows of individual enclosures, formed of connected side panels and door panels, and is designed to be readily transportable to a remote location for assembly.

6 Claims, 11 Drawing Figures

MODULAR KENNEL BUILDING

FIELD OF THE INVENTION

This invention relates to multiple enclosures for housing animals.

BACKGROUND OF THE INVENTION

There are many devices currently available for housing a large number of animals in a central facility. The most commonly employed method is to erect a permanent immovable fence to form enclosures with a dirt or concrete base. Other devices employed include those comprising chain-link fence, board fence or similar panels which may or may not be designed for outdoor implementation. One problem associated with these devices is communication of disease between enclosures. Further, the lack of portability decreases the ease of installation in remote locations.

I have previously invented a modular kennel for housing a plurality of animals. However, the kennel suffered many of the deficiencies of prior art kennels, which are overcome in the apparatus of the present invention.

Therefore it is one object of this invention to provide a novel means for housing animals in a modular structure, capable of easy and rapid installation, and completely self-contained for convenient erection at remote locations. It is a further object of this invention to provide a novel means for housing animals in a multiplicity of cages in close proximity with little or no possibility of transmission of disease-communicating liquids between the adjacent enclosures.

BRIEF DESCRIPTION OF THE DRAWINGS

So that these and other objects of the invention may be more fully understood, the following pictorial representations are included, wherein:

FIG. 1a shows a detailed view of a roof purlin;

FIG. 3c shows a hinge assembly of a typical door panel;

DETAILED DESCRIPTION OF THE INVENTION

This invention relates specifically to multiple enclosures for housing animals, particularly dogs. When large numbers of animals are to be housed in a relatively confined area, numerous problems arise, including cost of the facility, portability when there is only a short-term housing requirement, and transmission of disease between the animals in adjacent enclosures.

Figure 1:
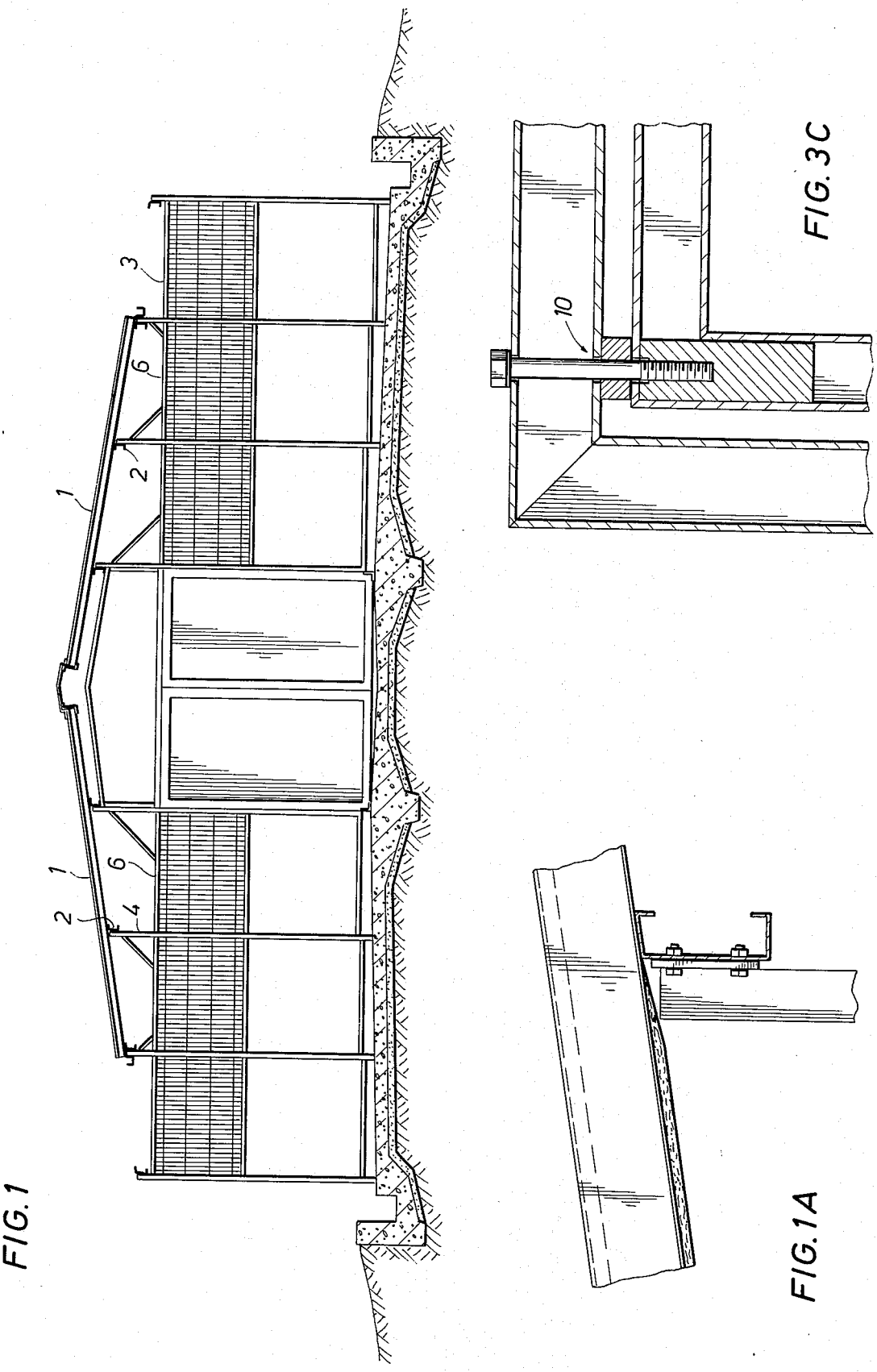
FIG. 1 shows a vertical section view of the kennel building.

FIG. 1 shows a section view of the housing system of the present invention, with the roof 1 supported by the walls 3 of the individual enclosures. The roof 1 made up of individual panels, is attached to the purlin 2 which in turn, through the support bar 4, is attached to the side panels 6. The roof panels may be similar to those designated "Steelox" and manufactured by Armco Steel Company. It is understood that although shown with attached roof 1, the housing system would be effectively the same if the enclosures were erected within an enclosed building, obviating the necessity for any attached roof. Another embodiment of this invention would result from erecting the enclosures in an outdoor environment with no roof.

Figure 2:
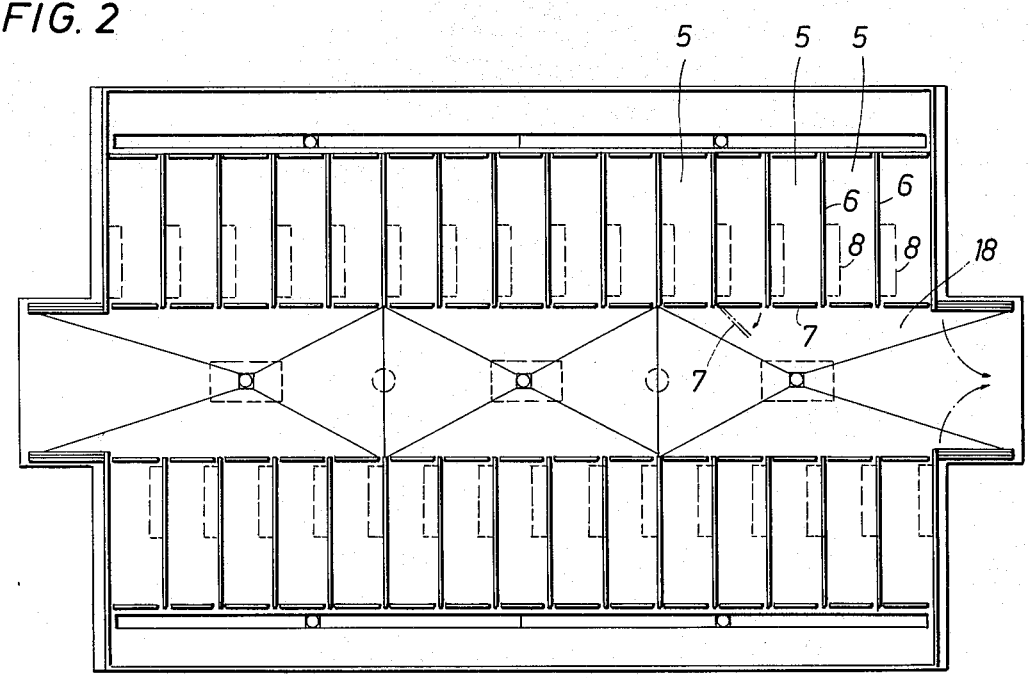
FIG. 2 shows a floor plan of a partially covered kennel building and associated vestibular protrusions on each end thereof.

Referring to FIG. 2, there is shown a plan view of a typical animal enclosure, the arrangement comprising individual kennels 5 and a walkway 18 separating the two rows of kennels. The individual kennels 5 are formed by side panels 6 and door panels 7. One unique feature of this invention is its modular construction. The side panels 6 are fully interchangeable one with the other, and the door panels 7 are also interchangeable. Additionall, the door panels 7, shown as opening on the one side may be reversed to open on the other side. It is preferable that all doors on one side of the kennel building open in the same direction.

Included in each individual enclosure 5 is a resting board 8, comprising a wooden surface some relatively small distance above the floor of the enclosure, for the purpose of allowing the housed animal to rest on a surface above the floor.

Figure 3:
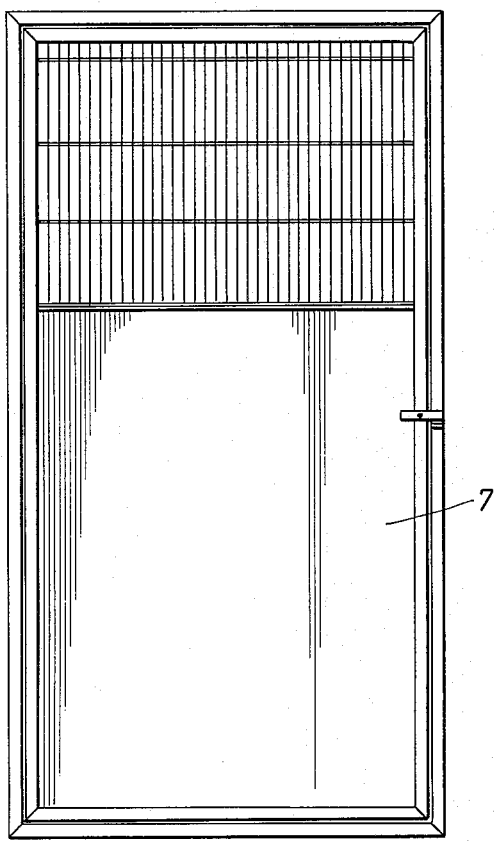
FIG. 3 shows a typical door panel which may be partially screened as shown, all screened, or fabricated with solid sheet on the upper and lower portions.
Figure 3A:
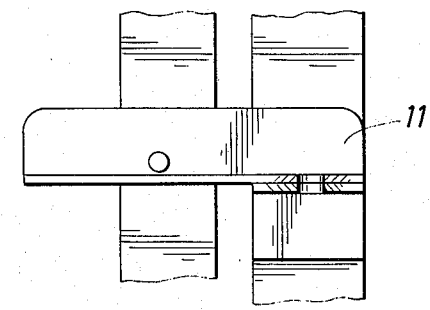
FIG. 3a shows the door latch assembly of a typical door panel.
Figure 3B:
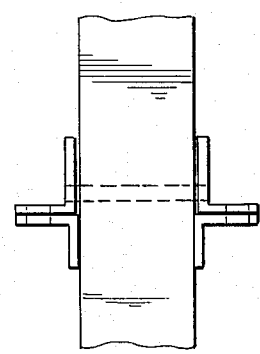
FIG. 3b shows an end view of the door latch assembly.
Figure 4:
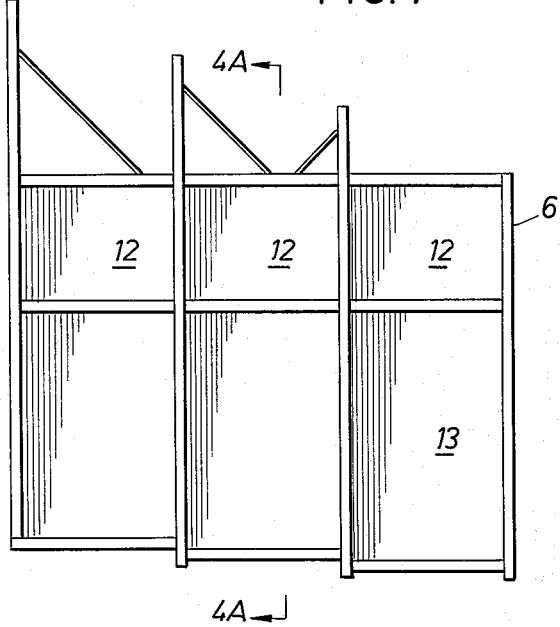
FIG. 4 shows a typical side panel which may be solid as shown or partially screened as shown in FIG. 3.

Now referring to FIG. 3, there is shown a door panel 7 which may be partially screened as shown, or fully screened, or fully paneled, similar to the side panel 6 shown in FIG. 4. The type of screening would be a designer's choice, and may be either a conventional crosshatch screen or bars of sufficiently close spacing to provide the necessary security and strength. The interchangeability of the door panels 7 may be appreciated by noting the hinge points 10, FIG. 3c, and door latch 11, FIG. 3a. In order to provide for a left-opening door vice a right-opening door as shown, it is only necessary to change the location of the respective hinge points 10 and door latch 11, a simple procedure that may be accomplished even after installation.

FIG. 4 shows a typical side panel 6 and full screening 12 consisting of solid sheet material, covering the full panel. The side panel 6 may be manufactured in any convenient width, dependent upon the overall dimension desired for each individual enclosure 5 (FIG. 2).

Figure 4A:
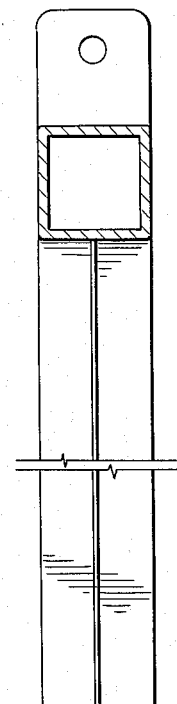
FIG. 4a shows a cross sectional view of the side panel 6 of FIG. 4.

As previously discussed, one major problem associated with close proximity housing is transmission of disease between individual enclosures. This may be caused by direct contact of one animal with another, or by fluids from one enclosure being introduced into the adjoining enclosure. The apparatus of this invention is designed to prevent the physical contact of animals by employing side panels 6 (FIG. 4) with the lower portion 13 thereof being constructed of a solid sheet material. The entire panel is fabricated from aluminum sheet and extruded material, with the lower portion being of 0.100 inch sheet aluminum material, commercially available from Reynolds Aluminum under the designation 0.100 inch sheet, 6061-T6 aluminum. The exterior frame for the side panel 6 may be constructed of square tubing, commercially available with a cross section shown in FIG. 4a and designated 1½inch square tube, 6063-T6 aluminum.

Figure 5:
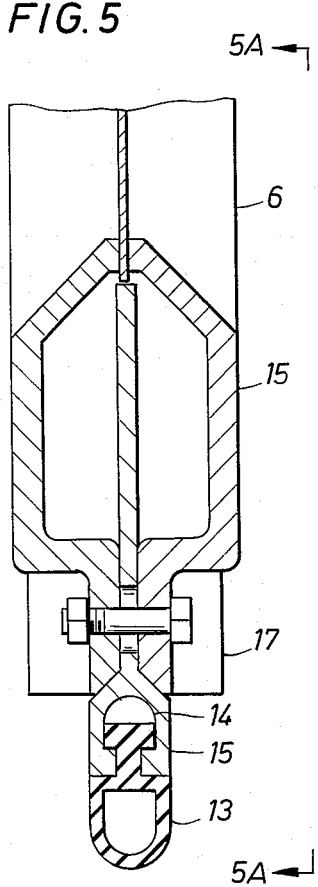
FIG. 5 shows a section view of the lower portion of a side panel, with the gasket means detachably connected to the lower edge thereof.
Figure 5A:
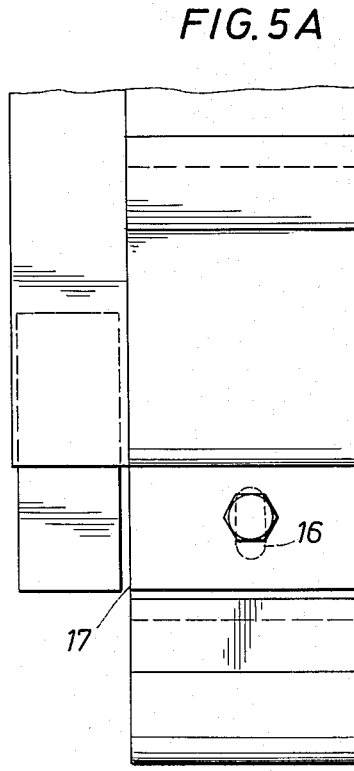
FIG. 5a shows a side view of the adjustable gasket assembly of FIG. 5.

The further requirement in animal enclosures to inhibit communication of disease is some apparatus to prevent transmitting fluids between adjoining enclosures. It can be easily seen that a board fence placed on a concrete slab may prevent contact of the animals, but will not be effective in stopping a liquid from passing thereunder. Thus, there is provided as a novel feature of this invention, a gasket 13, shown in FIG. 5, for sealing the opening between the bottom of the panels 6 and 7, and the concrete or other suitable material floor. The cross section view in FIG. 5 shows the bottom portion of the side panel 6 and a gasket 13 of suitable material being attached thereto by insertion into the channel 15 in the bottom of the panel 6. The gasket 13 is of sufficient flexibility to conformably adapt itself to the contour (if any) of the base upon which it rests and to fill in rough areas on such base. Additionally, there is provided on adjustment point 16, FIG. 5a, and others not shown, which allow the channel 15 to be adjusted at an angle to the length of the bottom framing member 17 of the side panel 6. This permits, for example, the side panel 6 to be mounted horizontally on a sloped surface, with the gasket 13 adjusted to be in firm contact with such sloped surface along the length of the channel 15.

What I claim is:

1. A modular animal enclosure, comprising:
   a. a plurality of side panels and door panels, said side and door panels having bottom framing members and being arranged to enclose individual compartments;
   b. a channel affixed to the bottom of side panels and door panels, said channel being adjustable at an angle to the bottom framing member of said side panels and door panels, for permitting angular displacement between said channel and said side panels and door panels to permit horizontal arrangement of said panels on a sloping surface; and
   c. a gasket attached to the bottom of said channel of said side panels and said door panels for preventing communication of fluids between said compartments.

2. The modular animal enclosure of claim 1,
   a. including a roof over said compartments;
   b. wherein roof support members are detachably connected to said side panels; and
   c. said roof is connected to said roof support members.

3. The modular animal enclosure of claim 1, including a vestibule comprised of side panels and door panels on one or more sides of said enclosure.

4. The modular animal enclosure of claim 3, wherein said vestibule is displaced at some angle from one side of the animal enclosure.

5. The modular animal enclosure of claim 1, wherein said side panels are fully interchangeable one with the other.

6. The modular animal enclosure of claim 1, wherein said channel is affixed to the solid sheet lower portion of said side panels and said door panels so as to facilitate movement of said channel with relation to said solid sheet when changing the angular disposition between said bottom framing member and said channel.

* * * * *